United States Patent [19]

Yoshizawa et al.

[11] Patent Number: 5,011,414

[45] Date of Patent: Apr. 30, 1991

[54] KEY-INPUT APPARATUS OR CAI SYSTEM

[75] Inventors: Yasuo Yoshizawa, Yonezawa; Hiroichi Kawaguchi, Chiba; Kazunari Seto, Yokosuka, all of Japan

[73] Assignees: Yoshiki Industrial Co., Ltd, Yonezawa; Uchida Yoko Co., Ltd., Tokyo, both of Japan

[21] Appl. No.: 373,598

[22] Filed: Jun. 30, 1989

Related U.S. Application Data

[63] Continuation-in-part of Ser. No. 2,396, Dec. 15, 1986, abandoned.

[30] Foreign Application Priority Data

Apr. 18, 1985 [JP] Japan .................. 60-83219

[51] Int. Cl.⁵ .................. G09B 5/00; G09B 7/07; G06F 15/20
[52] U.S. Cl. .................. 434/431; 434/118; 434/336; 434/430
[58] Field of Search .............. 434/118, 323, 335, 336, 434/350, 430, 431

[56] References Cited

U.S. PATENT DOCUMENTS

| 2,984,016 | 5/1961 | Nagle | 434/431 |
|---|---|---|---|
| 4,004,354 | 1/1977 | Yamauchi | 434/336 |
| 4,359,222 | 11/1982 | Smith, III et al. | 273/85 G |
| 4,715,818 | 12/1987 | Shapiro et al. | 434/323 |
| 4,737,110 | 4/1988 | Masuda | 434/336 |
| 4,764,120 | 8/1988 | Griffin et al. | 434/336 |

FOREIGN PATENT DOCUMENTS

| 0137602 | 4/1985 | European Pat. Off. . | |
| 2829434 | 1/1980 | Fed. Rep. of Germany | 434/430 |
| 2853673 | 7/1980 | Fed. Rep. of Germany . | |
| 56-78866 | 6/1981 | Japan . | |
| 56-116141 | 11/1981 | Japan . | |
| 56-162146 | 12/1981 | Japan . | |
| 58-164031 | 1/1983 | Japan . | |
| 59-165034 | 6/1984 | Japan . | |

Primary Examiner—Edward M. Coven
Assistant Examiner—Jessica J. Harrison
Attorney, Agent, or Firm—Oblon, Spivak, McClelland, Maier & Neustadt, P.C.

[57] ABSTRACT

A large number of keys arranged in a matrix are provided on the keyboard (KB) of a host computer. Of these keys, keys (K10, ..., K15, ...), located at positions corresponding to Learning terminals in a classroom, are assigned to the respective learning terminals.

5 Claims, 12 Drawing Sheets

| | | |
|---|---|---|
| 1 | | |
| 2 | | |
| ⌇ | ⌇ | ⌇ |
| 10 | #1 | G1 |
| 11 | #1 | G2 |
| 12 | | |
| ⌇ | ⌇ | ⌇ |
| 79 | | |
| 80 | | |

KEY-INPUT APPARATUS OR CAI SYSTEM

This application is a Continuation-In-Part of application Ser. No. 002,396, filed on Dec. 15, 1986, now abandoned.

TECHNICAL FIELD

The present invention relates to a key-input apparatus used in a CAI system as an instructional or learning system utilizing a computer.

BACKGROUND ART

In recent years, much attention has been given to a CAI (Computer-Aided Instruction) system which can provide, in an interactive manner, instructions corresponding to individual learning levels, as well as multitudinous instructions, using a computer. In the basic CAI system, a plurality of learning terminals provided in a classroom are connected to a host computer. Instructions corresponding to individual learning levels are provided such that the entire progress of a class is managed using the computer, while problems are posed to the respective terminals and answers are received therefrom, in an interactive manner. In this CAI system, a key-operation console for specifying which of the learning terminals is/are to be used is provided at a teacher's side, so that various instructions and information are supplied from the teacher to students utilizing the learning terminals, via the key-operation console, or a teacher can selectively communicate with the students.

The conventional CAI system described above is designed in accordance with the layout of a classroom, and a special-purpose key-operation console is designed and manufactured in accordance with the arrangement of learning terminals in the classroom. However, there are various classroom layouts; for example, 20 students (4 rows×5 columns), 24 students (4 rows×6 columns), 48 students (6 rows×8 columns), 40 students (8 rows×5 columns). Therefore, if the key-operation console is designed and manufactured in accordance with a specific classroom layout this results in high equipment cost. In addition, if key-operation consoles corresponding to specific classroom layouts are individually manufactured, this results in poor maintainability.

Figure 1:
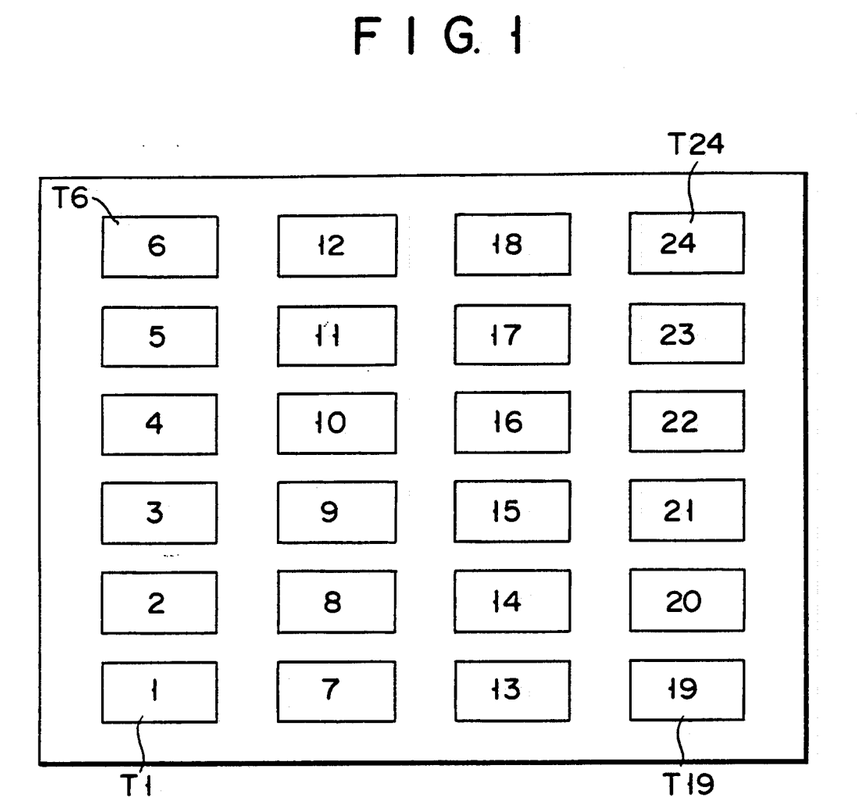
FIG. 1 is a view showing an arrangement of learning terminals in a classroom.
Figure 2:
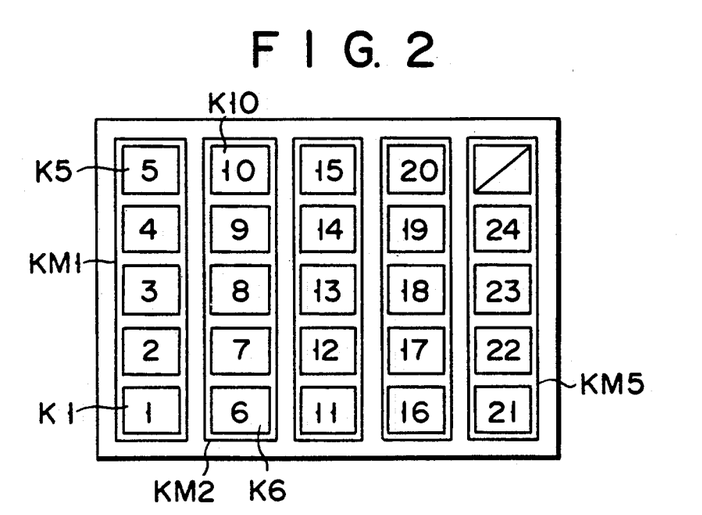
FIG. 2 is a view showing a key matrix on a key-operation console of a host computer of a conventional CAI system.

It is proposed to combine a predetermined number of keys to constitute a module key, and to combine a plurality of such module keys to arrange, at low cost, a key-operation console corresponding to the desired classroom layout. However, as is shown in FIG. 1, when key modules, each consisting of five keys, are used to realize a key-operation console for a classroom where 24 learning terminals T1 to T24 are arranged in a 6 (rows)×4 (columns) matrix, this presents the following drawback:

In this case, since the necessary number of keys is 24, five key modules are prepared. Five key modules KM1 to KM5 are arranged, to realize a key-operation console, as is shown in FIG. 2. For this reason, the key matrix differs from the learning terminal matrix in the classroom. As a result, the correspondence between the keys and the learning terminals is rendered unclear, thus resulting in poor operability of the key-operation console.

SUMMARY OF THE INVENTION

The present invention has been made in consideration of the above situation, and has as its object to provide a key-input apparatus for a CAI system, which has good key operability, allows easy maintenance, and can be realized at low cost.

The key-input apparatus comprises a key-operation console having a plurality of keys, arranged in a matrix, greater in number than that of the learning terminals in a classroom, in both row and column directions; a table memory which stores data of the learning terminals selectively assigned to the keys of the key-operation console; and a means for searching a learning terminal, corresponding to an operated key of the key-operation console, by use of the table memory. The respective learning terminals in the classroom are selectively assigned to the plurality of keys of the key-operation console, arranged in a matrix, in correspondence with the arrangement of the learning terminals.

According to the present invention, the keys on the key operation console are assigned to the learning terminals in the classroom, and keys which are not assigned to learning terminals are covered with, for example, a key mask. Thus, the correspondence between the keys on the key-operation console and the learning terminals can be visually recognized with ease, thus improving its operability. A key on the keyboard can be assigned to each learning station, in a pattern corresponding to the positions of the learning stations in the classroom. Therefore, this system can cater to a wide variety of classroom layouts.

Therefore, it is not necessary to prepare various key-operation consoles to suit differing classroom layouts this results in low equipment cost and easy maintainability.

PREFERRED MODE FOR CARRYING OUT THE INVENTION

An embodiment of the present invention will now be described in detail, with reference to the accompanying drawings.

Figure 3:
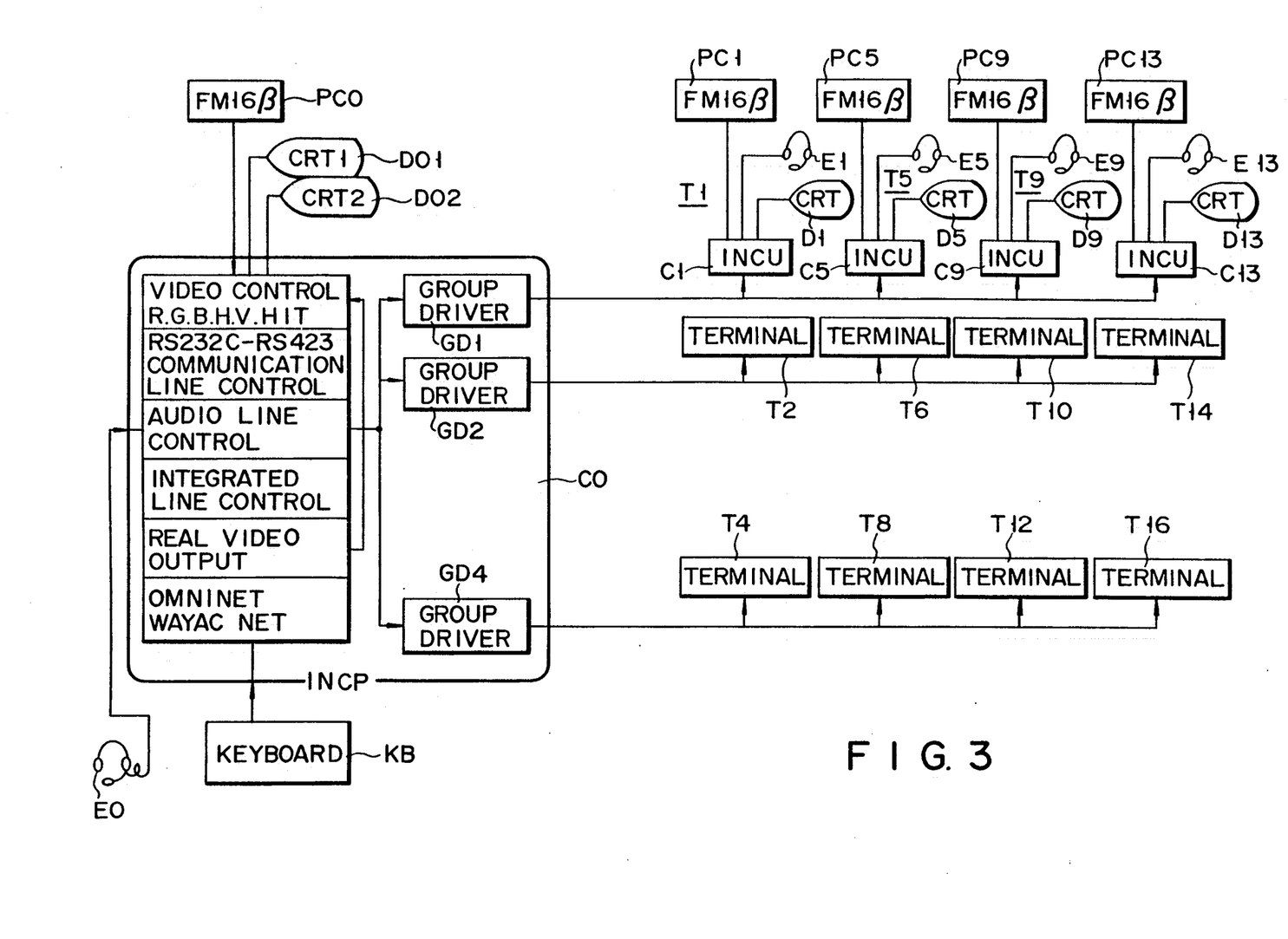
FIG. 3 is a block diagram showing the entire arrangement according to an embodiment of the present invention.
Figure 4:
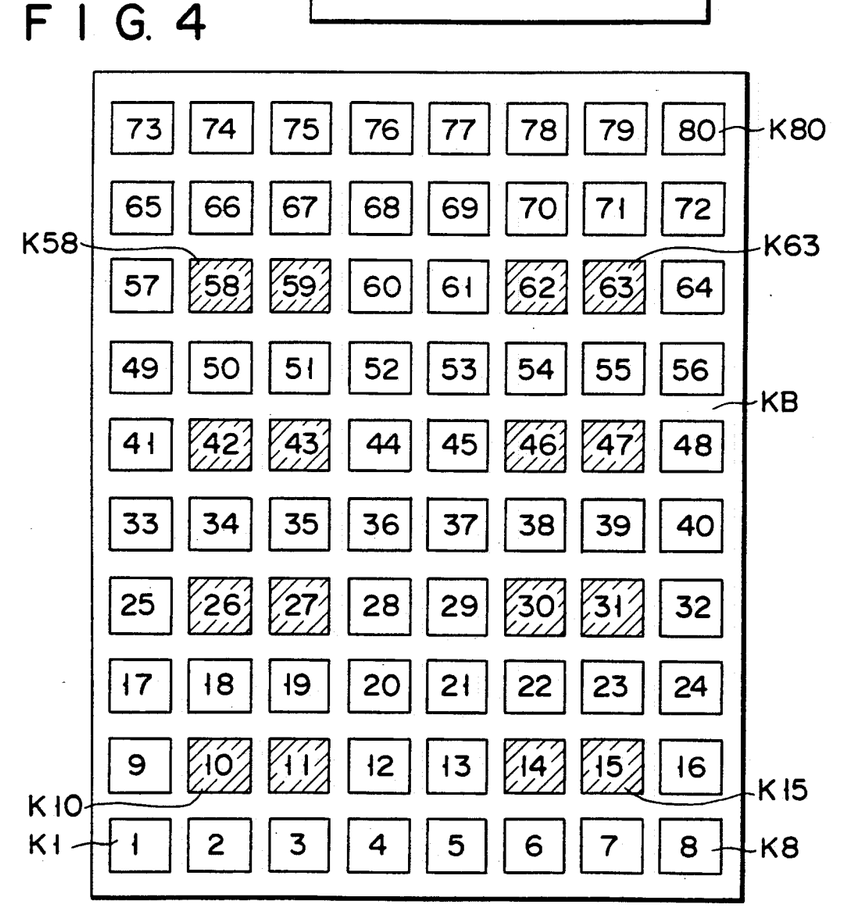
FIG. 4 is a view showing the arrangement of all the keys on the keyboard shown in FIG. 3.

Keyboard KB shown in FIG. 3 has 80 operation keys K1 to K80 arranged in a 10 (rows)×8 (columns) matrix, as shown in FIG. 4. Keyboard KB is arranged on host control section CO. Host control section CO is connected to host personal computer PC0, together with transmitter/receiver E0 and two CRT displays DO1 and DO2. Host control section CO is controlled together with personal computer PC0.

Figure 5:
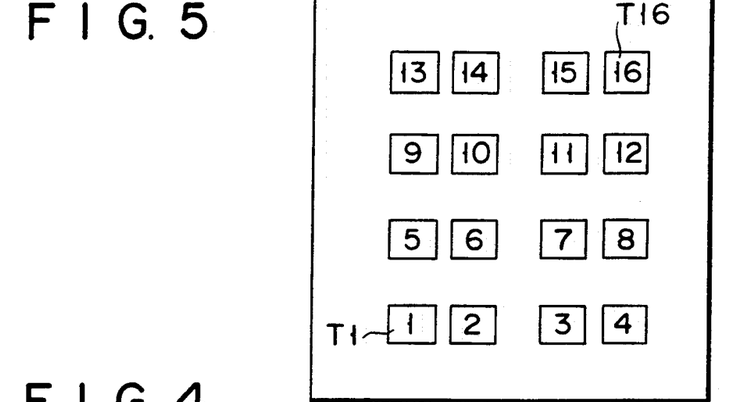
FIG. 5 is a view showing an arrangement of learning terminals in a classroom.

Host control section CO is used by a teacher in a classroom, and selectively specifies a plurality of, for example, 16 (4 rows×4 columns) learning terminals T1 to T16, as shown in FIG. 5, to control various data communications between terminals T1 to T16 and personal computer PC0, transmitter/receiver E0, and CRT displays DO1 and DO2.

Learning terminals T1 to T14 include personal computers PC1 to PC4, transmitter/receivers E1 to E4, CRTs D1 to D4, and terminal control units C1 to C4, as is shown in FIG. 3. Other terminals T5 to T16 have the same arrangement as above. In this embodiment, four terminals T1 to T4 are commonly connected to first group driver GD1 in host control section CO, terminals T5 to T8 are commonly connected to group driver GD2, and terminals T13 to T16 are commonly connected to fourth group driver GD4.

The number of keys arranged on keyboard KB is 80, i.e., keys K1 to K80, as is shown in FIG. 4, and the keys are arranged in a 10 (rows)×8 (columns) matrix. The number of keys is selected to be greater in number than that of the learning terminals normally used in a classroom, in row and column directions. In this embodiment, as is shown in FIG. 5, since 16 learning terminals T1 to T16 are arranged in a 4×4 matrix, 16 keys K10, K11, K14, K15, ..., K62, and K63, indicated by hatching on keyboard KB in FIG. 4, are used. Numbers 1 to 16 are assigned to these keys, in correspondence with learning terminals T1 to T16, and unassigned keys are covered by overlying key mask KM (shown in FIG. 6A) on keyboard KB (shown in FIG. 4).

Figure 6A:
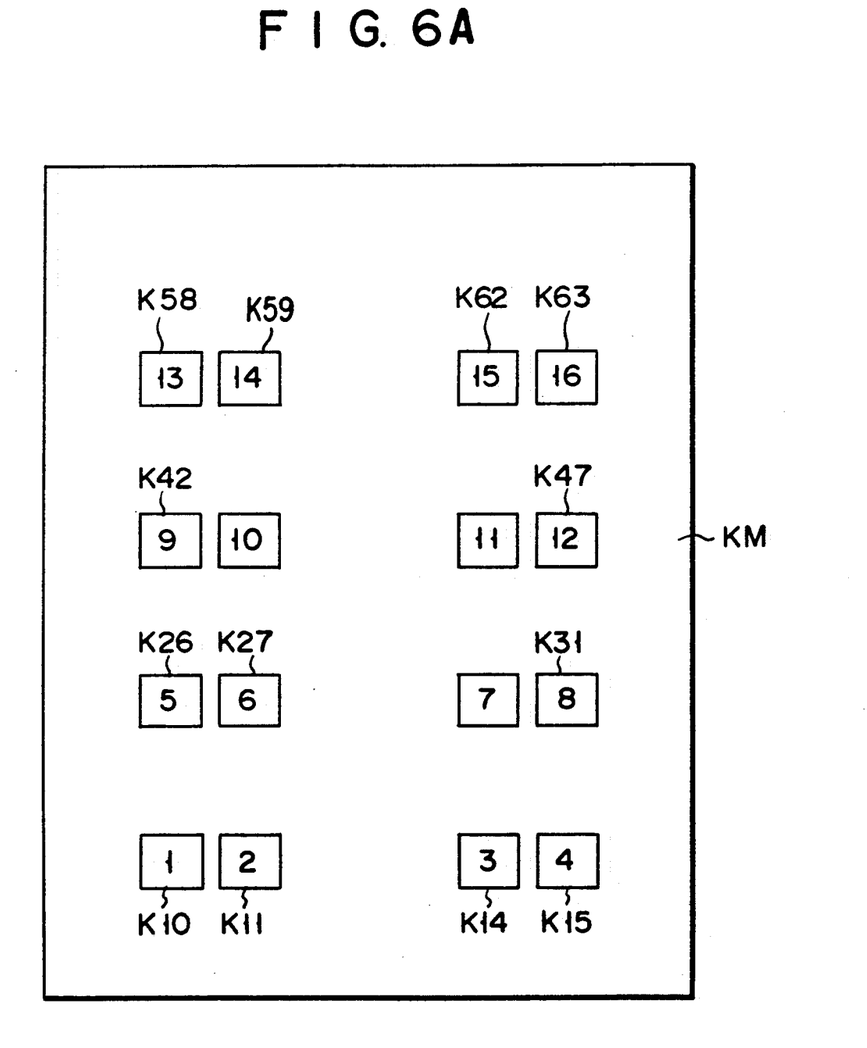
FIG. 6A is a view showing a state wherein the keyboard shown in FIG. 4 is covered with a key mask.
Figure 6B:
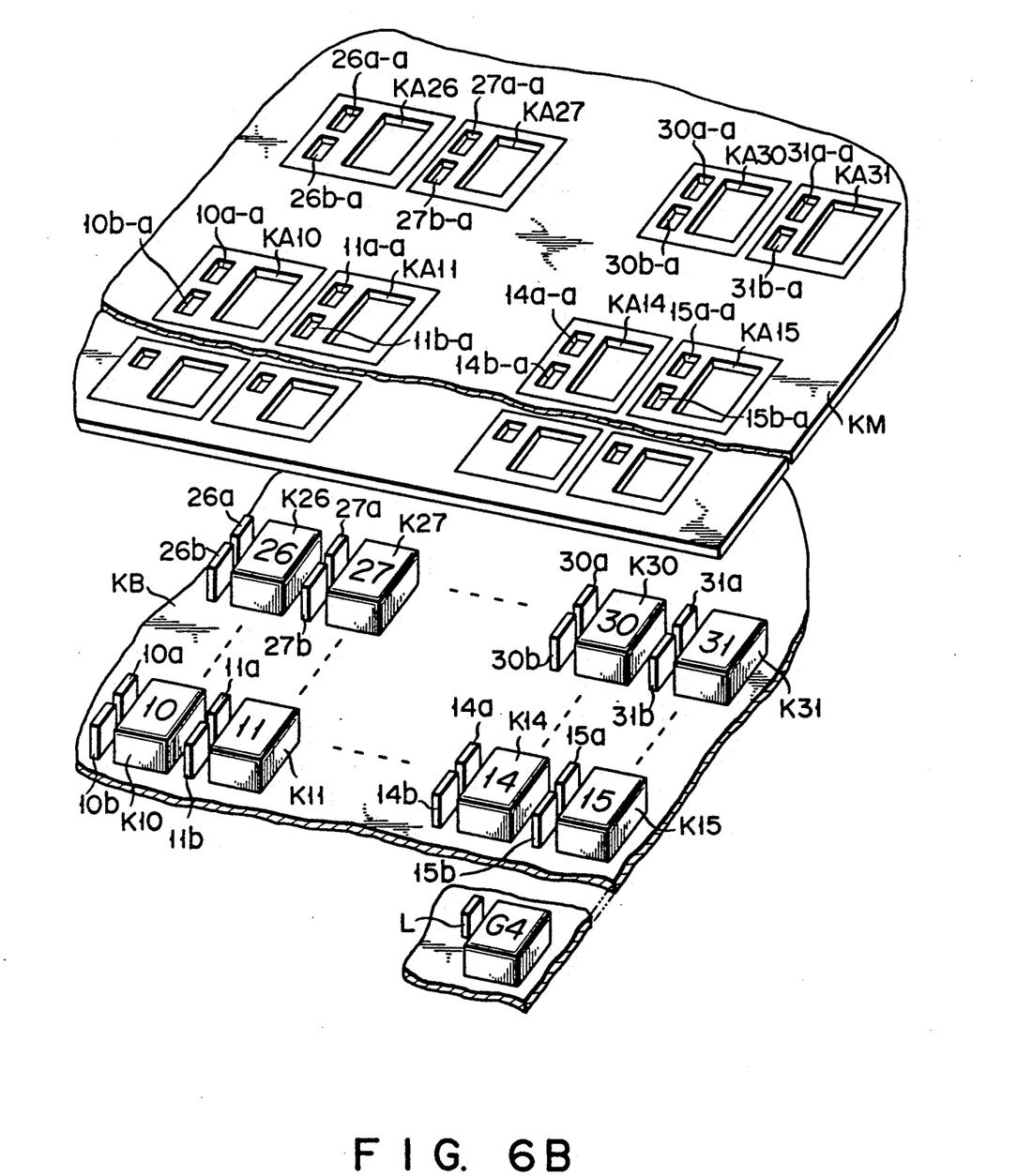
FIG. 6B shows a perspective view of the keyboard and the key mask shown in FIGS. 4 and 6A.

FIG. 6B shows a perspective view of the keyboard KB shown in FIG. 4 and the key mask KM shown in FIG. 6A. In FIG. 6B, the keys K10, K11,—K31 are arranged in a matrix fashion as shown in FIG. 4. Each of the keys K10 to K31 is associated with two display units, red LEDs 10a, 11a,—15a,—31a, and green LEDs 10b, 11b,—15b,—31b, in the left side of each key.

Key mask KM is provided with key apertures KA10, KA11,—KA31 and LED apertures 10a—a,—31a—a respectively corresponding to keys K10, K11,—K31, and LEDs 10a, 10b—31a, 31b.

In this case, all the keys and LEDs except for the 16 keys K10,—K63 as shown in FIG. 6A and the corresponding LEDs 10a,—63b are covered with the key mask KM, when it is put on the keyboard KB.

Figure 7:
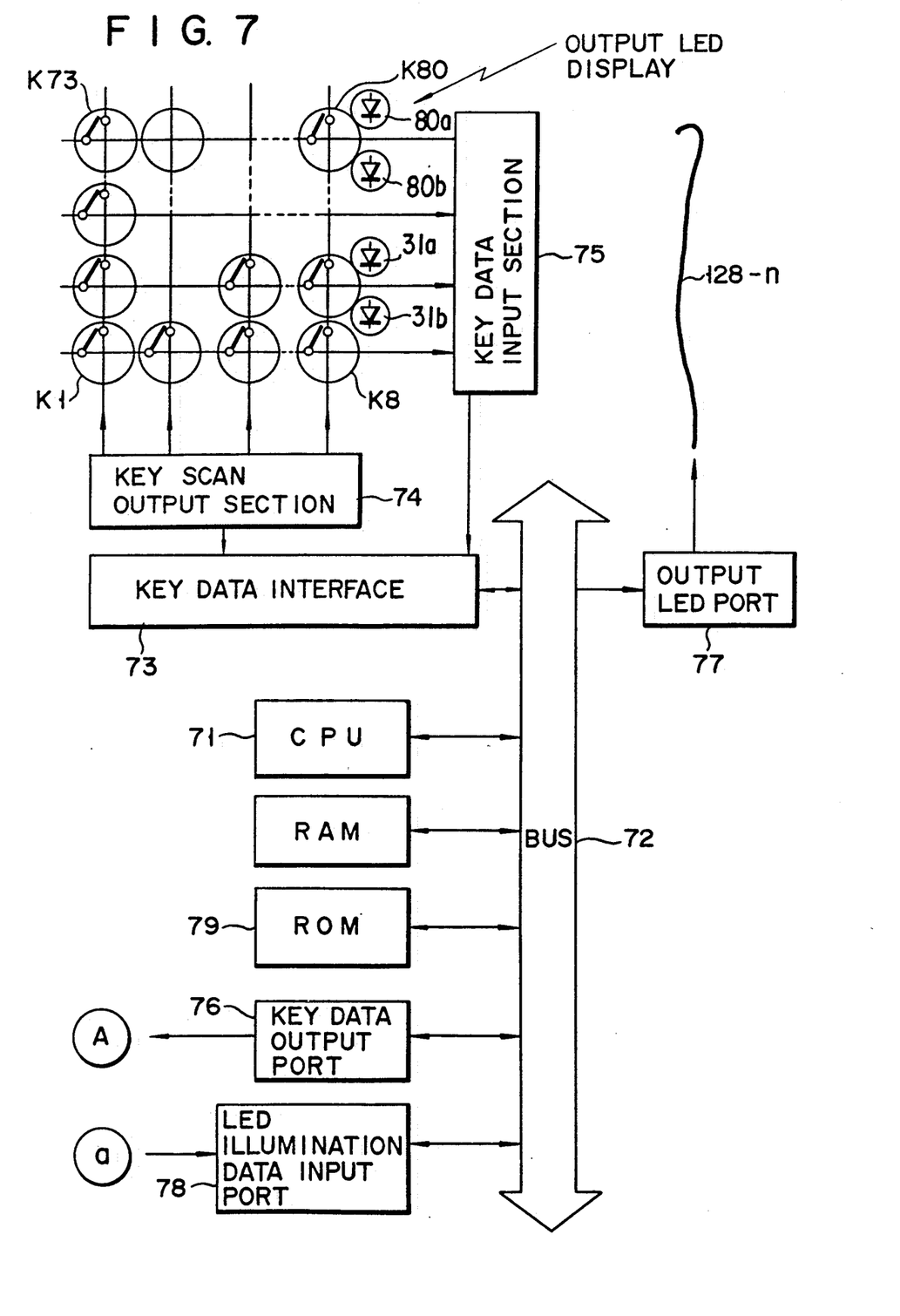
FIGS. 7 to 9 are detailed block diagrams of the arrangements of the respective sections in FIG. 3.

Keyboard KB shown in FIG. 6B is arranged as shown in FIG. 7. Keys K1 to K80 are key-scanned by CPU 71 via bus 72, key-data interface 73, and key-scan output section 74, and a key output from a depressed one of keys K1 to K80 is supplied to key-data output port 76 from key-data input section 75, via key-data interface 73. Reference numeral 77 denotes an output LED port for energizing red LEDs 10a, 11a,—31a corresponding to depressed keys. Reference numeral 78 denotes a data input port for intermittently illuminating the red LEDs 10a, 11a,—31a in accordance with calls from terminals T1 to T16.

Figure 8:
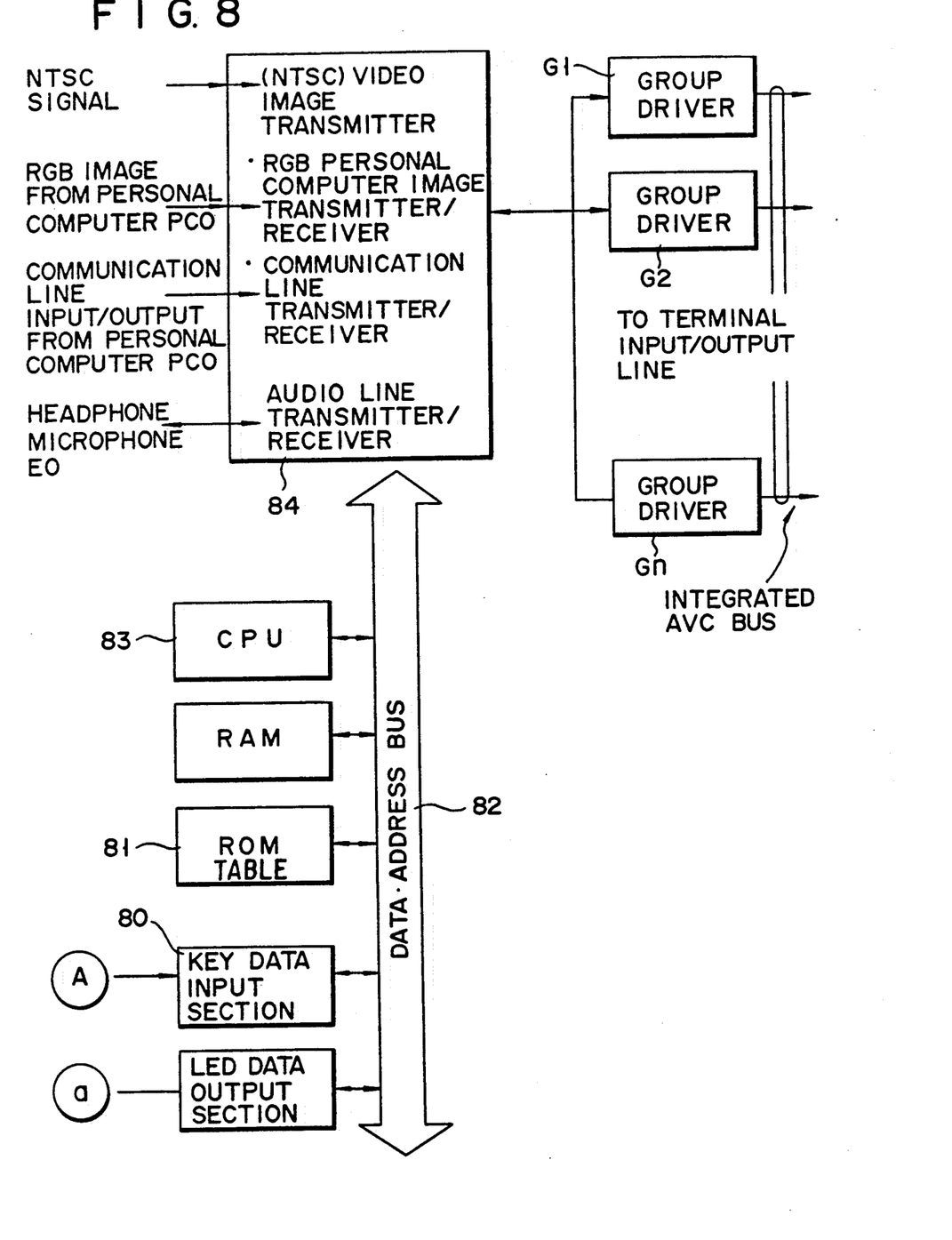

FIG. 8 is a block diagram showing the arrangement of host control section CO and personal computer PC0.

Key-data output from key-data output port 76 in FIG. 7 is input to key-data input section 80 shown in FIG. 8, and is supplied to ROM table 81, via data address bus 82. Table 81 is used for reading out group number # data and intragroup number # data by making assigned key No. 10 on keyboard KB corresponding to the original number of a depressed key. For example, if key No. 1 (K10) in FIG. 6A is depressed, it is detected, by the key-scanning action of CPU 71, that the depressed key is key No. 10 on keyboard KB, and group data G1 and intragroup number data #1 can be obtained from ROM 81, in accordance with supplied key data No. 10. ROM table 81 is controlled by CPU 83 in personal computer PC0. The group data may be obtained by operating a group designating key provided on the keyboard KB. For example, as shown in FIG. 6B, a group designating key G4 and the associated LED L are provided on the keyboard KB. The group designating key G4 is provided for a key group consisting of keys K15, K31, K47 and K63. Though not shown, group designating keys are provided for the remaining three key groups K10—K58, K11—K59 and K14—K62.

Data address bus 82 is connected to signal transmitter/receiver 84, and performs various data communications between personal computer PC0 and terminals T1 to T16.

Figure 9:
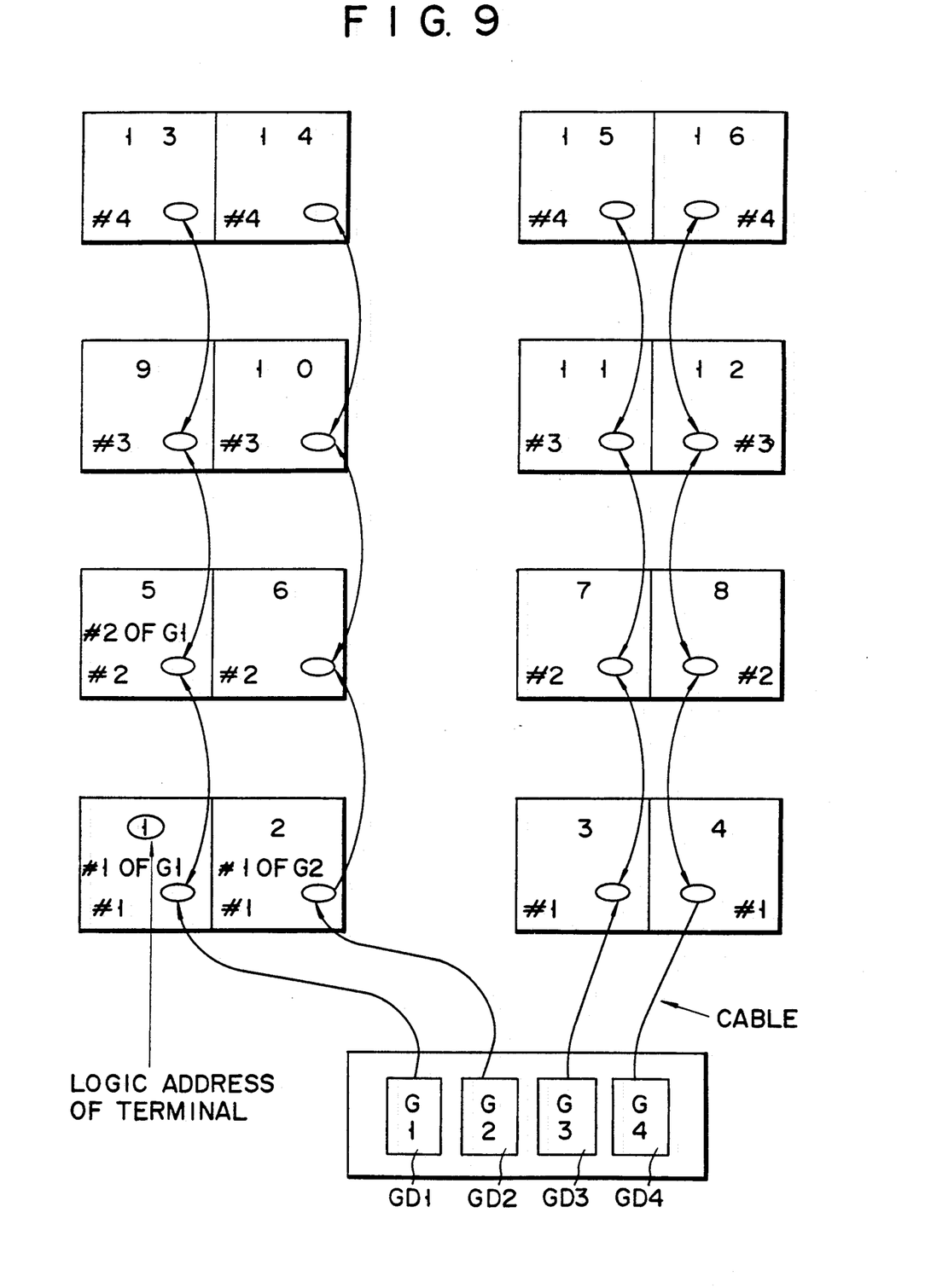

The terminals in the classroom are divided into four groups G1 to G4, each including four terminals. FIG. 9 shows the divided groups. More specifically, terminals T1, T5, T9, and T13 belong to first group G1. Similarly, terminals T2, T6, T10, and T14 belong to second group G2; T3, T7, T11, and T15 belong to third group G3; and T4, T8, T12, and T16 belong to fourth group G4. These terminals are connected to each other by cables, and are driven by group drivers GD1 to GD4. The terminals in each group are numbered from the first one, by using intragroup Nos. #1, #2, #3, and #4.

Figure 10:
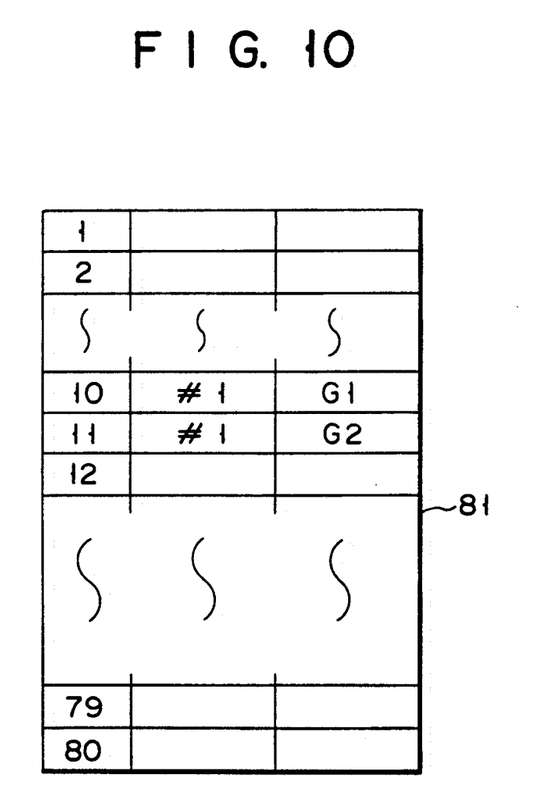
FIG. 10 is a memory map of the table ROM shown in FIG. 8.

FIG. 10 shows the content of ROM table 81, which stores data representing the relationship between the original number, the intragroup number, and the group number of each of terminals #1 to #4 which correspond to No. 1 to No. 80 of keys K1 to K80 (see FIG. 9). For example, the first key corresponds to key K10, belongs to group G1, and has an intragroup number of #1 in this group.

Figure 11:
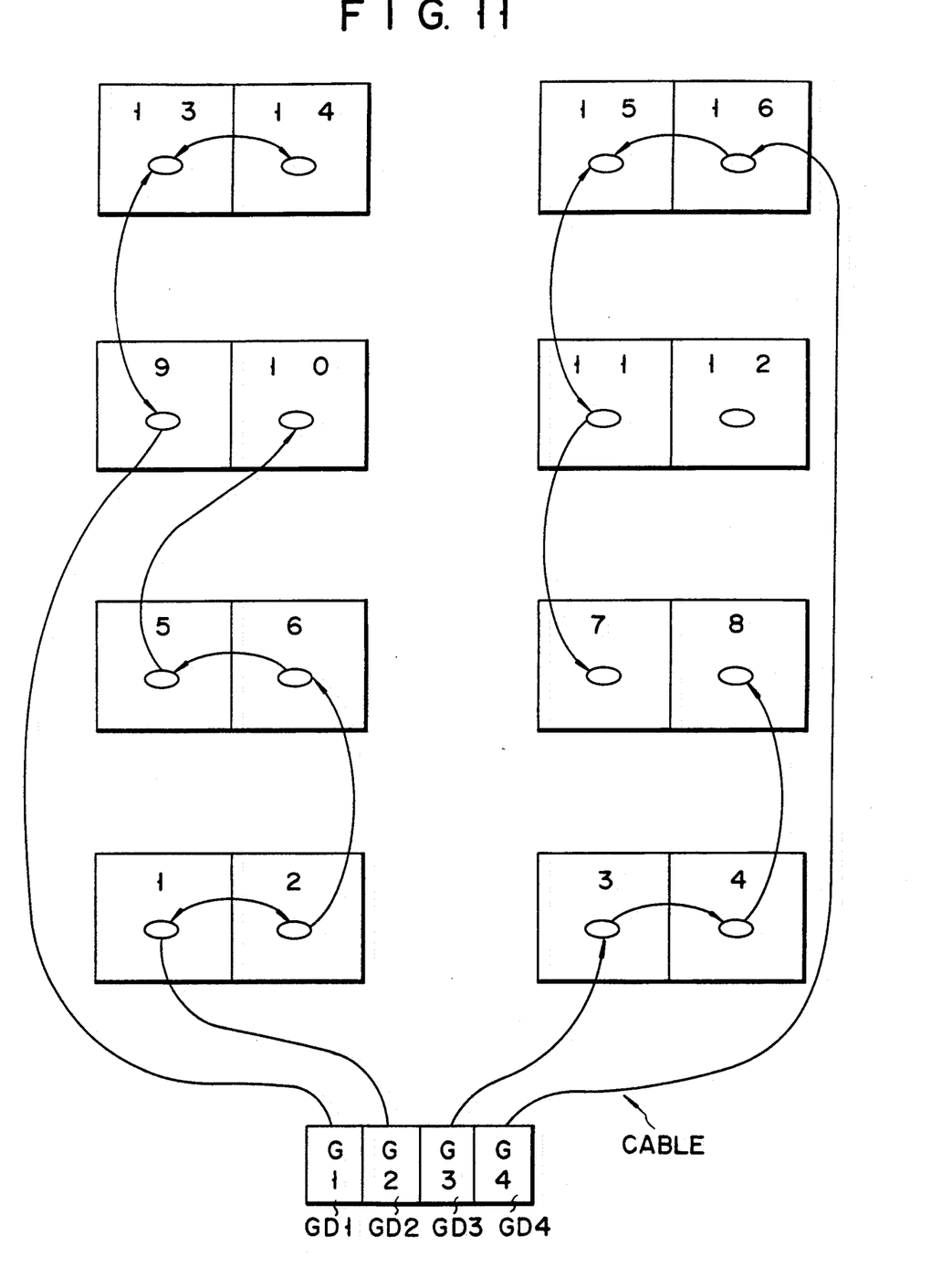
FIGS. 11 and 12 are block diagrams further showing the respective sections of FIG. 3.

Note that group division is not limited to that shown in FIG. 9. For example, as is shown in FIG. 11, the terminals need not be grouped in an identical column, and terminals in different columns can be connected. If terminals are arranged to suit an unusually-shaped classroom, for example, a circular classroom, they can be grouped accordingly.

Figure 12:
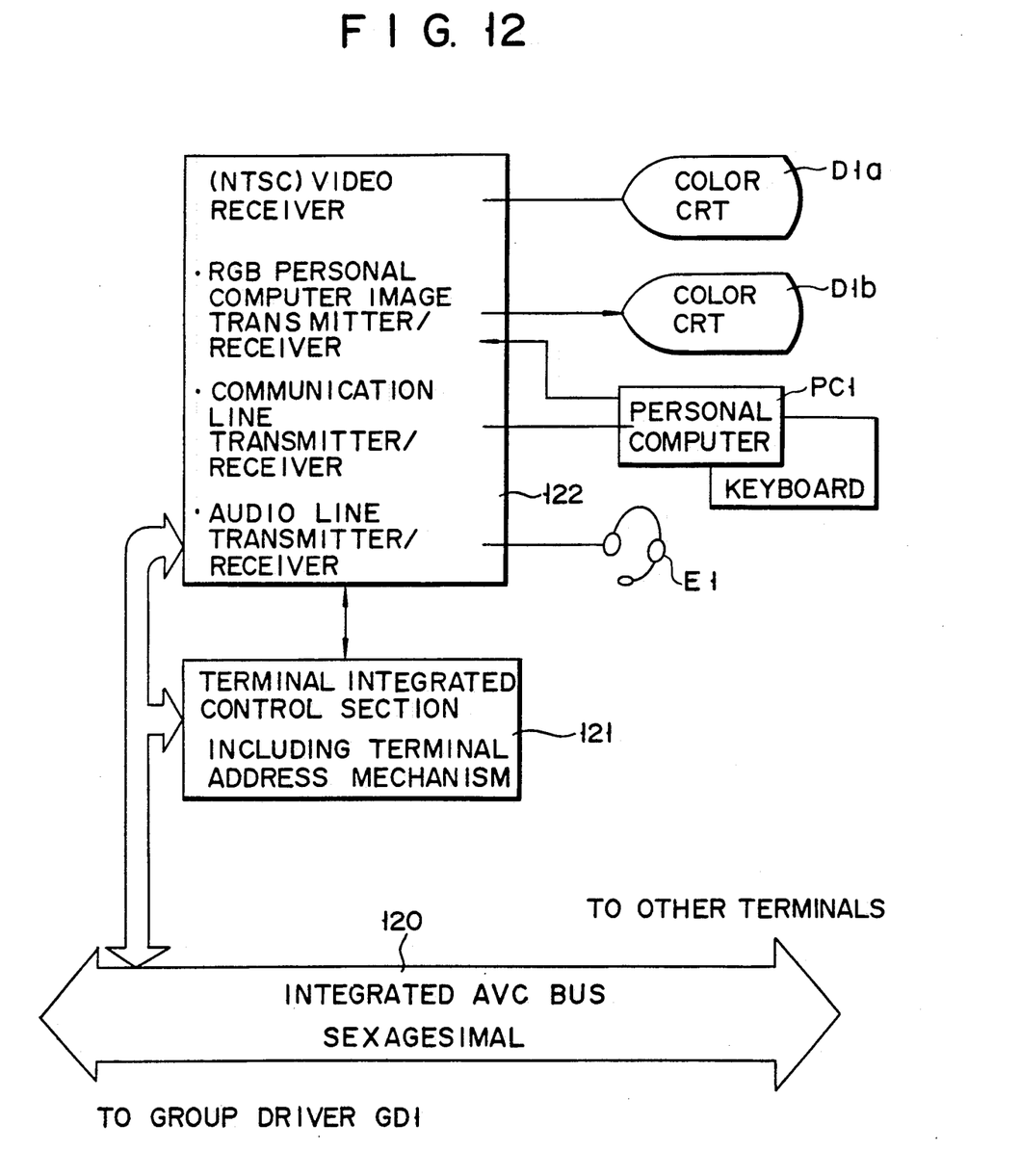
Figure 13A:
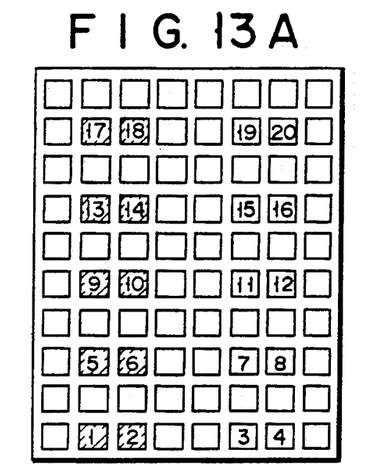
FIGS. 13A to 13F are key matrices corresponding to different arrangements of terminals in a classroom.
Figure 13B:
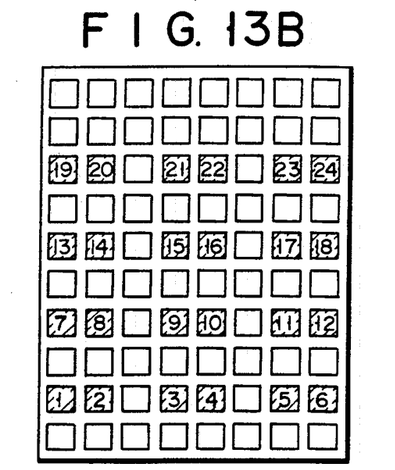
Figure 13C:
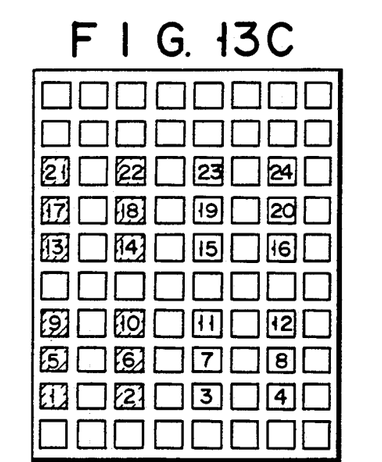
Figure 13D:
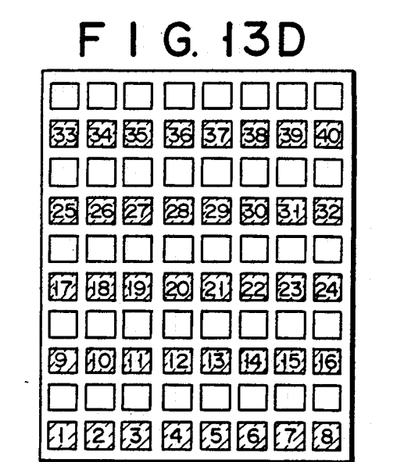
Figure 13E:
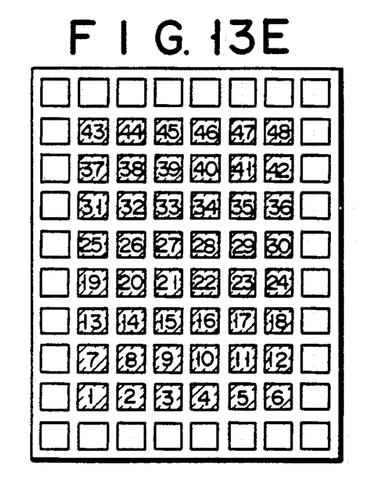
Figure 13F:
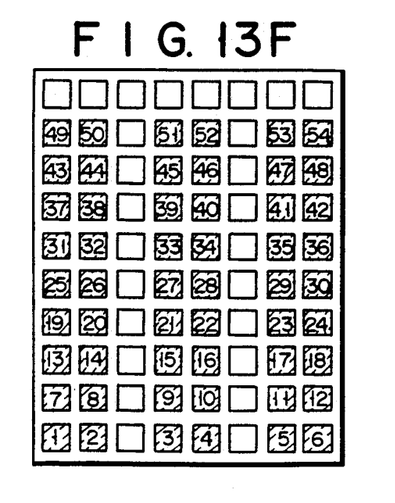

FIG. 12 shows the internal arrangement of a terminal, e.g., terminal T1, shown in FIG. 3. Output data of group driver GD1, in FIG. 3, is supplied to integrated network controller unit (INCU) 121 and terminal data transmitter/receiver 122, by way of, for example, sexagesimal integrated AVC bus 120. Transmitter/receiver 122 is connected to two color CRTs D1a and D1b.

With the key-input apparatus described above, a plurality of keys arranged in a matrix on keyboard KB are selectively used, and key-assignment corresponding to the arrangement of learning terminals T1 to T16 in a classroom can easily be made. Therefore, the key arrangement on keyboard KB for selectively specifying learning terminals T1 to T16 can coincide with the arrangement of learning terminals T1 to T16 in the classroom. Therefore, the operability can be greatly improved in terms of visuality.

The key input apparatus can cater for, for example, e.g., a classroom for 20 students (5 rows×4 columns), a classroom for 24 students (4 rows×6 columns), a classroom for 24 students (6 rows×4 columns), a classroom for 40 students (5 rows×8 columns), a classroom for 48 students (8 rows×6 columns), a classroom for 54 students (9 rows×6 columns), and the like, as is shown in FIGS. 13A to 13F. The key-input apparatus of this embodiment can cater for a classroom of a maximum of 80 students (8×10) without the need to change the specifications of keyboard KB. Therefore, if classrooms are built in a variety of different layouts, since keyboards KB therefor have common arrangements, they can be maintained commonly, resulting in easy maintainability. Since keyboard KB need not be designed in accordance with specific classroom layouts, it can be mass-produced, thereby resulting in reduced cost.

The present invention is not limited to the above embodiment. For example, the number of keys prepared on a key-operation console, and its matrix arrangement, can be selected taking the maximum capacity of a normal classroom into consideration. A cover or the like can be appropriately provided for keys which are not assigned to learning terminals 5. Various other changes and modifications may be made within the spirit and scope of the invention.

We claim:

1. A key-input apparatus for a computer-aided instruction system, comprising:

a keyboard having a plurality of keys arranged in a matrix and in which a plurality of learning terminals are selectively assigned to said plurality of keys in correspondence with the arrangement of said learning terminals in a classroom, the number of said keys being more than that of said learning terminals in the classroom in both row and column directions;

first indication means for indicating a key of said keys on said keyboard corresponding to a calling terminal of said learning terminals;

second indication means for indicating an operated key of said keys on said keyboard corresponding to a called terminal of said learning terminals called by a teacher;

a table memory for storing the relationship between said keys of said keyboard and said learning terminals assigned thereto;

means for specifying the learning terminal corresponding to the operated key on said keyboard through said table memory; and a plurality of key masks each of which is selectively put on said keyboard to identify on the keyboard only selected keys corresponding to the learning terminals arranged in the classroom so that the keys identified by each of said key masks coincide visually with the arrangement of the learning terminals in the classroom.

2. A key-input apparatus according to claim 1, wherein said first indication means include a plurality of first group of LEDs each of which is provided with a key corresponding to the calling terminal and said second indication means include a plurality of second group of LEDs each of which is provided with a key corresponding to the called terminal.

3. A key-input apparatus according to claim 2, wherein said first group of LEDs are red LEDs and said second group of LEDs are green LEDs.

4. A key-input apparatus according to claim 2, which further comprises means for intermittently energizing said first group of LEDs in accordance with a call from a learning terminal.

5. A key-input apparatus according to claim 1, wherein each of said key masks has key apertures and LED apertures for receiving said keys and LEDS, respectively.

* * * * *